United States Patent Office 3,202,649
Patented Aug. 24, 1965

3,202,649
METAL-CONTAINING REACTIVE AZO DYES
Willy Steinemann, Basel, Switzerland, assignor to Sandoz Ltd. (also known as Sandoz A.G.), Basel, Switzerland
No Drawing. Filed May 3, 1962, Ser. No. 192,287
Claims priority, application Switzerland, Feb. 26, 1960, 2,161/61
7 Claims. (Cl. 260—146)

This application is a continuation-in-part of the application Ser. No. 90,196, filed February 20, 1961 (now abandoned), and relates to metal-containing reactive dyes, which in the metal-free state correspond to the formula

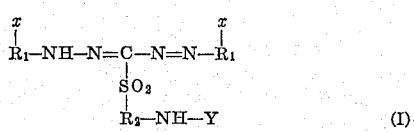

wherein each
$R_1$—$x$ represents the same radical of a diazo component of the benzene series,
$x$ represents a hydroxy or carboxy group in ortho position to the nitrogen atom,
$R_2$ represents an arylene radical which may be substituted, and
$Y$ represents a group which contains at least one substituent that may be readily split off as an anion and/or an unsaturated radical whose multiple linkage is easily capable of addition.

Among the copper-, nickel- and cobalt metallized dyes of the above Formula I, dyestuffs of particularly valuable properties are those of the formula

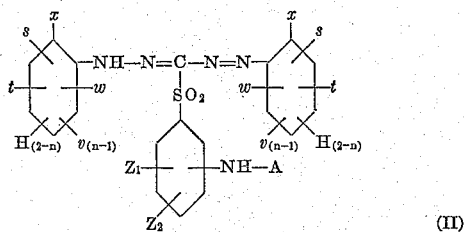

wherein
$x$ represents a hydroxy or carboxy group,
$s$ represents a hydrogen or chlorine atom, a methyl, nitro or alkanoylamino group,
$t$ represents a hydrogen or chlorine atom, a methyl or a nitro group,
$v$ represents lower alkyl-sulfonyl, sulfonic acid, sulfonic acid amide, sulfonic acid lower alkylamide, sulfonic acid di-(lower alkyl)-amide, sulfonic acid lower hydroxalkylamide, sulfonic acid di-(lower hydroxyalkyl)-amide, sulfonic acid lower alkoxyalkylamide, sulfonic acid di-(lower alkoxyalkyl)-amide, sulfonic acid cycloalkylamide, sulfonic acid carboxy-lower alkylamide, sulfonic acid sulfo-lower alkylamide or sulfonic acid mononuclear arylamide which may bear one to two water-solubilizing groups such as carboxylic acid, sulfonic acid or optionally substituted sulfonic acid amide groups,
$w$ represents a hydrogen or chlorine atom,
$Z_1$ represents hydrogen, lower alkyl, lower alkoxy or carboxy,
$Z_2$ represents hydrogen, lower alkyl or lower alkoxy,
$A$ represents a halogenopyrimidyl radical with 1 to 3 halogen atoms, a 4,6-dihalogeno-1,3,5-triazinyl-2-radical, a 4-halogen-6-optionally substituted amino-1,3,5-triazinyl-2-radical, a halogeno-lower alkanoyl radical, a lower alkenoyl radical, a halogeno-lower alkenoyl radical or a trichloropyrimidyl-lower alkanoyl radical, halogen having an atomic weight between 35 and 81, i.e. being chlorine or bromine, and the optional substituents of the amino group being preferably lower alkyl, lower hydroxyalkyl, lower alkoxyalkyl, lower carboxyalkyl, lower sulfoalkyl, mono- or dinuclear aryl, mononuclear carboxyaryl, mononuclear mono- or disulfoaryl, dinuclear mono-, di- or trisulfoaryl,
and
$n$ is one of the integers 1 and 2.

Another group of dyes are the copper, nickel and cobalt complex compounds of dyes of the formula

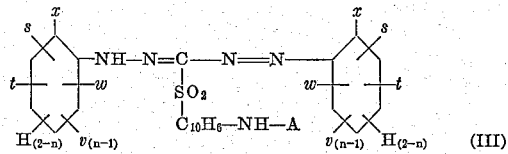

wherein $x$, $s$, $t$, $v$, $w$, $n$ and $A$ have the above named meanings and $C_{10}H_5$ represents a naphthylene radical.

The process for their production consists in reacting the metal-complex compounds of dyes of the formula

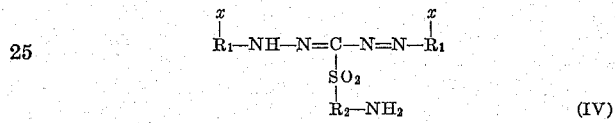

wherein $R_1$, $R_2$ and $x$ have the above-mentioned meanings, with compounds which are condensible with a substance containing an exchangeable hydrogen atom and which furthermore contain at least one substituent that may be readily split off as an anion and/or an unsaturated radical whose multiple linkage is easily capable of addition.

The dyes of Formula IV used as starting products can be produced, e.g., by reacting two moles of the diazo compound of an amine of the formula

wherein $R_1$ and $x$ have the aforenamed meanings, with one mol of a compound of the formula

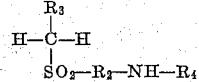

wherein
$R_2$ has the aforenamed meaning,
$R_3$ represents a carboxylic acid group or a group convertible into said group
and
$R_4$ represents hydrogen or a hydrolyzable acyl group, and, if necessary, splitting off the hydrolyzable acyl group $R_4$ before or after metallization. In the latter case the conversion of the acylamino group into the amino group must be carried out under conditions which ensure that the metal-containing dye is not degraded.

As compounds which are condensible with a substance containing an exchangeable hydrogen atom and which furthermore contain at least one substituent that may be readily split off as an anion and/or an unsaturated radical whose multiple linkage is easily capable of addition, the following are suitable: functional derivatives of chloroacetic acid, bromoacetic acid, β-chloro- or β-bromopropionic acid, α,β-dichloro- or α,β-dibromopropionic acid, acrylic acid, methacrylic acid, α-chloro-, or α-bromoacrylic acid, α,β- and β,β-dichloro- or -dibromoacrylic acid, trichloro- or tribromocrylic acid, γ-chlorocrotonic acid, γ-bromocrotonic acid, 2,4,6-trichloro- or 2, 4, 6-tribromopyrimidyl-5-acetic acid; further the following heterocyclic compounds: cyanuric chloride, cyanuric bromide, primary condensation products of a cyanuric halide of the composition

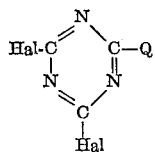

wherein Hal stands for chlorine or bromine and Q for the radical, which may be substituted, of a primary or secondary aliphatic, alicyclic, aromatic or heterocyclic amine, an aliphatic, alicylic, aromatic or heterocyclic hydroxy or thiol compound, especially the radical of aniline, its alkyl or sulfonic acid or carboxylic acid derivatives, or of lower mono- or dialkyl amines, or the radical of ammonia; further 2,4,6-trichloropyrimidine and 2,4,6-tribromopyrimidine, and their derivatives which for example carry the following substituents in 5-position: methyl, ethyl, carboxylic acid, carboxylic acid methyl or ethyl esters, alkylene, e.g. allyl, chlorovinyl, substituted alkyl, e.g. carboxymethyl, chloro- or bromomethyl, 2,4,5,6-tetrachloro- or -tetrabromopyrimidine, 2,6-dichloro- or -dibromopyrimidine-4-carboxylic acid methyl or ethyl ester 2,4,5-trichloropyrimidine, 2,4,5-tribromopyrimidine, 2,4-dichloro- or -dibromopyrimidine, 2,5,6-trichloro-4-methylpryimidine, 2,5,6-tribromo-4-methylpyrimidine, 2,4 - dichloro - 5 - chloromethyl - 6 - methylpyrimidine, 2,4 - dibromo - 5 - bromomethyl - 6 - methylpyrimidine, 2,4 - dichloro - 5 - chloromethylpyrimidine, 2,4 - dibromo - 5 - bromomethylpyrimidine and 2,6 - dichloro - 4 - trichloromethylpyrimidine.

As a rule, the introduction of the acid radical is most easily accomplished by using the corresponding acid halide, or in certain cases the acid anhyride. It is preferable to work at low temperatures, e.g. 0–20° C., and in presence of an acid-binding agent such as sodium carbonate, sodium hydroxide, calcium hydroxide, sodium acetate or sodium chloroacetate at a weakly acid, neutral or weakly alkaline reaction, for example in the pH region of 4 to 9. For acylation, the carboxylic acid chlorides are used as such or dissolved in two to five times their amount of benzene, chlorobenzene, methylbenzene, dimethylbenzene or acetone, and are added dropwise to the aqueous, well buffered solution of the substance containing the amino group at a temperature of e .g. 2–5° C. Acylation can be carried out with the anhydrides in the same way.

The introduction of a dihalogeno-cyanuric radical is best carried out in aqueous medium at about 0° C. and at a weakly acid reaction, e.g. at a pH value between 2 and 5. The cyanuric halide is used as such in solid form or dissolved in an organic solvent, e.g. acetone. It is best to work at a temperature of 30–60° C. and a pH value of 4–6 with the primary condensation products of a cyanuric halide, while for the di-, tri- and tetrahalogenopyrimidines a temperature between 40° and 100° C. and pH-values of 9 to 3 are the most suitable, the condensation being carried out advantageously in the presence of acid-binding agents, e.g. buffer mixtures and/or substances of alkaline reaction which are added gradually to the condensation mixture.

Copper-, nickel- or cobalt-yielding agents, e.g. copper formate, copper acetate, copper sulfate or the corresponding nickel or cobalt compounds are preferably used for the production of the metal complex compounds of the dyes of Formula II. Coppering, for example, can be effected by various methods, one such method being to heat the dyes with a copper salt in weakly acid to alkaline medium, if necessary under pressure, and/or in the presence of ammonia and/or organic bases, or in concentrated aqueous solutions of alkali metal salts of low molecular aliphatic monocarboxylic acids. Conversion into the nickel complex compounds is carried out in the same way. The obtained copper or nickel complex compounds are mainly 1:1 complexes in which one molecule of formazan dye is combined with approximately 1 copper or nickel atom.

It is advantageous to carry out the conversion of the dyes of Formula II into cobalt complex compounds in aqueous solution or in an organic medium such as formamide, dimethyl-formamide, ethyl glycol, or in the concentrated aqueous solution of an alkali metal salt or a low molecular aliphatic monocarboxylic acid. It is advantageous to allow an amount of cobalt-yielding agent containing one cobalt atom to act upon one molecule of dye.

As cobalt compounds, cobaltous formate, cobaltous acetate and cobaltous sulfate may be used. When metallization is carried out in the concentrated aqueous solution of an alkali metal salt of a low molecular aliphatic monocarboxylic acid, insoluble cobalt compounds may also be used, e.g. cobalt hydroxide and cobalt carbonate.

It is especially beneficial to carry out the reaction giving the cobalt complex in aqueous or alkaline medium, the cobalt compounds being added in presence of compounds which maintain the cobalt dissolved in complex combination in caustic alkaline medium, e.g. tartaric acid, citric or lactic acid.

The organic cobalt reaction solution may be run into water and the cobalt complex compound thus obtained is then precipitated from aqueous medium by the addition of salt, filtered off, washed if necessary and dried.

The cobalt-containing dye obtained are homogeneous cobalt complex compounds, in which essentially one atom of cobalt is combined with one molecule of the formazane dye. The cobalt complex compounds are mainly so called 1:1 complexes wherein one molecule of the formazane dye is combined with approximately 1 cobalt atom.

The metal-containing reactive dyestuffs according to the invention are suitable for the dyeing of leather; for the dyeing, padding and printing of fibers of animal origin, e.g. wool and silk; synthetic polyamide fibers, e.g. nylon; cellulosic fibers, e.g. cotton and linen; fibers of regenerated cellulose, eg viscose rayon, cuprammonium rayon, viscose staple fiber and mixtures and/or blends of these fibers. The optimum conditions of application vary according to the type of fiber and the dye used. Animal fibers and synthetic polyamide fibers are dyed and printed or fixed preferably in acid, neutral or weakly alkaline medium, e.g. in presence of acetic acid, formic acid, sulfuric acid, ammonium sulfate, sodium metaphosphate, etc. It is also possible to dye in acetic acid to neutral medium in presence of levelling agents, e.g. polyoxethylated fatty amines or mixtures of the same with alkylpolyglycol ethers, and at the end of dyeing to neutralize the bath to a neutral or weakly alkaline reaction by the addition of small amounts of an alkaline reacting agent, e.g. ammonia, sodium bicarbonate, sodium carbonate, etc., or compounds which react alkaline on heating, e.g. hexamethylene tetramine, or urea. The goods are then thoroughly rinsed and if necessary soured with a little acetic acid. The dyeings thus obtained are fast to light, washing, milling, perspiration, water, rubbing and dry cleaning.

The dyes which contain 3 or 4 water-solubilizing groups (carboxylic acid groups which do not take part in metal complex formation and/or sulfonic acid groups and/or sulfonic acid amide groups), e.g. two or three sulfonic acid groups and one carboxylic acid group or three or four sulfonic acid groups, possess good solubility in water, and yield stable printing pastes and padding liquors, so that they are especially suitable for the printing and padding of cellulosic fibers, whereas the dyes with 1 to 2 water-solubilizing groups which are less water-soluble can be employed for the dyeing of cellulosic fibers according to the exhaustion dyeing process.

The dyeing, padding and printing or fixing of the dyes on cellulosic fibers is carried out advantageously in alkaline medium, e.g. in presence of sodium carbonate, sodium bicarbonate, sodium hydroxide solution, potassium hydroxide solution, sodium metasilicate, sodium borate, trisodium phosphate, ammonia, etc. To obviate reduction effects in dyeing, padding and printing, mild oxidizing agents, such as sodium 1-nitrobenzene-3-sulfonate, are often beneficial. As a rule, fixation of the dye on cellulosic fibers also is effected at a higher temperature. A number of dyes, depending on the reactivity of the reactive groupings, may also be fixed at low temperatures, e.g. 20° C. to 40° C.

The addition of certain quaternizable amines such as trimethylamine, triethylene-diamine or of asymmetric dimethylhydrazine, preferably in stoichiometric amounts, accelerates the fixation of the dye on the fibers, so that the fixation temperature can be lowered and/or the fixation time shortened.

The dyeing and prints on cellulosic fibers are especially notable for their excellent wet fastness properties, which are due to the formation of a stable chemical linkage between the dye molecule and the cellulose molecule (fastness to water, sea-water, perspiration, wet rubbing and boiling with sodium carbonate solution). In addition they also possess good fastness to light and to dry cleaning (organic solvents). Often the whole amount of dye applied does not take part in the chemical reaction with the fiber. In this case, the unfixed dye portion is removed from the fiber by suitable operations, such as rinsing and/or soaping, if necessary at higher temperatures, for which purpose synthetic detergents may also be used, e.g., alkylarylsulfonates, sodium lauryl sulfate, sodium lauryl polyglycol ether sulfate, optionally carboxymethylated alkylpolyglycol ethers and mono- or dialkylphenylpolyglycol ethers.

In the following examples the parts and percentages are by weight and the temperatures in degrees centigrade.

EXAMPLE 1

43.4 parts of 1-amino-2-carboxybenzene-4-sulfonic acid are diazotized in a mixture of 200 parts of water and 6.3 parts of 30% hydrochloric acid at 0° by means of 13.8 parts of sodium nitrite. 27.3 parts of finely ground 4-carbomethoxyamino-phenyl-1-sulfonyl-acetic acid and 20 parts of a mixture of pyridine bases are added to the neutral, well-cooled diazo solution, and with good cooling 200 parts of 10% sodium hydroxide solution are added dropwise in the course of several hours at an even rate. During the coupling reaction the carboxylic acid group of the coupling component is replaced by a hydrogen atom and the carbon dioxide split off is bound by the sodium hydroxide. On completion of coupling 125 parts of a copper sulfate solution with a content of 20% $CuSO_4 \cdot 5H_2O$, which has been previously made markedly alkaline with 30 parts of 25% aqueous ammonia solution, are added to the reaction mass. The whole is heated to 60° until the complex formation is completed and subsequently to 90° until the carbomethoxyamino group is completely saponified. The red solution is cooled to 20° by the addition of ice and brought to pH 6 with 10% hydrochloric acid. In the course of several hours this solution is added dropwise to a finely dispersed suspension of 23 parts of cyanuric chlorine in 200 parts of water 0° so that the pH value of the reaction solution is constant at 2.0–2.2. When no further free amino groups are indicated the dyestuff is precipitated by means of sodium chloride, filtered off, washed with sodium chloride solution and carefully dried with vacuum.

Cotton is padded with a 1% solution of the new dye, rolled up and stored at room temperature for several hours. After rinsing and soaping, a fast and bright bluish-red dyeing is obtained.

EXAMPLE 2

37.6 parts of 1-amino-2-hydroxybenzene-5-sulfonic acid amide are diazotized in a mixture of 200 parts of water and 30 parts of 30% hydrochloric acid at 5° by means of 13.8 parts of sodium nitrate. 34.8 parts of finely ground 4-carbethoxyaminonaphthyl-1-sulfonyl-acetic acid and 20 parts of a mixture of pyridine bases are then added to the diazo solution and in the course of several hours 280 parts of 10% sodium hydroxide solution are added dropwise at an even rate at 0–2°. During the coupling reaction the carboxylic acid group of the coupling component is replaced by a hydrogen atom and the carbon dioxide split off is bound by the sodium hydroxide. On completion of coupling 125 parts of an aqueous copper sulfate solution containing 20% $CuSO_4 \cdot 5H_2O$, which has been previously made markedly alkaline by means of 30 parts of 25% aqueous ammonia solution, are added to the reaction solution. The whole is heated at 60° until the complex formation is completed and subsequently at 90° until the saponification of the carbethoxyamino group, then cooled to 50° and the saponified dyestuff salted out with sodium chloride. The filtered and washed dye is added to 1200 parts of water at 40° and the pH value brought to 6 with 5% acetic acid.

In the course of several hours this weakly acid solution is added dropwise to an exteremly fine dispersion at 0° of 23 parts of cyanuric chloride in 200 parts of water, so that the reaction solution shows a constant pH value of 2.0–2.2. The reaction solution is then neutralized to pH 5 with dilute sodium carbonate solution at 0°, and the dye precipitated with sodium chloride and filtered off. The moist filtercake is added to 1000 parts of water at 20°.

This dye suspension is then added to a neutral solution of 24 parts of 1-aminobenzene-3-sulfonic acid in 400 parts of water, slowly heated to 50° and maintained at this temperature and at a pH value of 5 by the addition of dilute sodium carbonate solution until the concentration of hydrogen ions no longer increases. The new dye is precipitated with sodium chloride, filtered off and carefully dried with vacuum.

Cotton is padded with a 2% aqueous solution of this dye at 20°, dried, treated with a 30% aqueous solution of sodium chloride and 1% sodium hydroxide solution, steamed for a short time at 100° and subsequently rinsed and dried. A fast gray dyeing is obtained.

EXAMPLE 3

70.4 parts of 1-amino-2-hydroxybenzene-5-sulfonic acid-(2′,5′-dicarboxy)-phenylamide are suspended in an ice-cold solution of 200 parts of water and 26 parts of 30% hydrochloric acid, and diazotized by means of 13.8 parts of sodium nitrite. 31.7 parts of 3-carbethoxyamino-4-methoxyphenylsulfonyl-acetic acid in finely ground form are added to the yellow diazo solution, then in the course of several hours 250 parts of 10% sodium hydroxide solution are dropped in at an even rate at 0° and the mixture stirred at this temperature until the coupling reaction, which proceeds under replacement of the carboxylic acid group of the coupling component by a hydrogen atom, is completed. To the reaction solution is then added a solution of 25 parts of crystallized copper sulfate in 200 parts of water, previously made alkaline by means of 30 parts of 25% aqueous ammonia solution. The solution is heated at 60° until the complex formation is completed and subsequently at 90–95° until completion of the saponification of the carbethoxyamino group. The blue reaction solution is cooled to 75° and brought to a pH value of 5.5 with acetic acid, then 26 parts of 2,4,5,6-tetrachloropyrimidine are added and the reaction mixture stirred at 75° for 90 minutes, the pH value being maintained at 5.5 by the addition of sodium carbonate. On completion of condensation the dye is precipitated with sodium chloride, filtered off, washed with sodium chloride solution and carefully dried with vacuum.

A cotton fabric, padded with a 1% solution of this dye at 50° in presence of sodium carbonate, dried, heated for a short time at 150° and subsequently soaped at the boil, is dyed in a fast gray shade.

The analogous nickel complex dyestuffs produced according to the particulars given in the above example give brown pad dyeings.

EXAMPLE 4

61.6 parts of 1-amino-2-hydroxybenzene-4-sulfonic acid-(2'-carboxy)-phenylamide are converted into the chlorohydrate by heating in a mixture of 200 parts of water and 26 parts of 30% hydrochloric acid, and subsequently diazotized at 5° by means of 13.8 parts of sodium nitrite. A cold mixture prepared from 27.5 parts of 4-amino-2,5-dimethoxy-phenylsulfonyl-acetic acid is then added to the resulting yellow diazo suspension, and as quickly as possible sufficient sodium hydroxide (as 30% aqueous solution) is added with very good stirring to bring the pH value to 11.5. During this operation and subsequently until the close of the reaction, which proceeds under replacement of the carboxylic acid group of the coupling component by a hydrogen atom, the reaction temperature must be maintained below +2° by intensive cooling. To the deeply colored solution are added 15 parts of sodium hydrogen sulfite and 27 parts of pulverized copper sulfate-pentahydrate and the pH value adjusted to 6 with acetic acid. The mixture is then heated at 65° for 1 hour, allowed to cool to 25° and the blue dye salted out with sodium chloride. It is filtered off and washed with aqueous sodium chloride solution. The filter residue is dissolved in 800 parts of water at a pH value of 5.5, then 17.5 parts of 2,4,5,6-tetrachloropyrimidine are added and the whole stirred at 75°, the pH value being held constant at 5.5 by the dropwise addition of 10% aqueous sodium carbonate solution. On completion of the condensation reaction, the new dye is isolated in the normal way and carefully dried with vacuum.

A mercerised cotton fabric is printed with a printing paste of the following composition:

20 parts of the dye produced according to the above example
100 parts of urea
450 parts of 3% sodium alginate thickening
15 parts of sodium carbonate
10 parts of sodium 3-nitrobenzene-sulfonate
405 parts of water 1000 parts The print is dried and fixed by steaming for 10 minutes. It is then rinsed in cold water in the normal way, soaped at the boil, rinsed again in cold water and dried. A gray-blue print of very good light and washing fastness is obtained.

When the 27 parts of copper sulfate pentahydrate used in the above example are replaced by 30 parts of cobalt sulfate heptahydrate or 30 parts of nickel sulfate heptahydrate and the process carried out as described, blue or brown prints respectively are obtained which have very good fastness to light and washing.

EXAMPLE 5

37.6 parts of 1-amino-2-hydroxybenzene-4-sulfonic acid amide are diazotized in the normal way and coupled with 24.5 parts of 3-amino-4-methoxy-phenylsulfonyl-acetic acid by the method described in Example 4. On completion of coupling 15 parts of sodium hydrogen sulfite, 30 parts of cobalt sulfate heptahydrate and as many parts of acetic acid as are necessary to adjust the reaction mixture to pH 6 are successively added to the alkaline dye solution. After heating for 45 minutes at 70°, the dye is precipitated with sodium chloride, filtered off at 35° and washed with sodium chloride solution. The filter residue together with 22 parts of 2,4,5,6-tetrachloropyrimidine and 40 parts of crystallized sodium acetate is stirred in 700 parts of water for 2 hours at 75°. After cooling to 40° and adding potassium chloride, th precipitated dye is filtered off, washed with aqueous potassium chloride solution and carefully dried with vacuum.

100 parts of wool fabric are entered into 5000 parts of a dyebath at 50° containing 2 parts of the product as described in the above example and 2 parts of acetic acid. The dyebath is brought to 100° in 45 minutes and held at the boil for a further 45 minutes. It is then neutralized by means of ammonium hydroxide and maintained at 90° for 20 minutes. After rinsing and drying, a gray-blue dyeing of very good light and wet fastness is obtained.

When the 30 parts of cobalt sulfate heptahydrate in the above example are replaced by 30 parts of nickel sulfate heptahydrate or 27 parts of copper sulfate pentahydrate and the process carried out as described, brown or gray dyeings respectively which have good light and wet fastness are obtained.

EXAMPLE 6

27.4 parts of 1-aminobenzene-2-carboxylic acid are dissolved in 400 parts of water by means of 26 parts of 30% hydrochloric acid and then diazotized at 0° with 13.8 parts of sodium nitrite. An ice-cold solution of 21.5 parts of 4-aminophenyl-sulfonyl-acetic acid in 150 parts of water and 13 parts of 30% hydrochloric acid is added to this diazo solution. Subsequently in 5 minutes 133 parts of 30% sodium hydroxide solution are run in with good stirring, the reaction temperature being prevented from rising above +4° by intensive cooling during the addition of alkali. Stirring is continued at 0-4° until the close of the reaction, during which carbon dioxide from the coupling component is split off and immediately bound by the sodium hydroxide, then the deep red solution is neutralized to a pH value of 5.5 with approximately 60 parts of glacial acetic acid and the precipitated dye filtered off. The filtercake is stirred into 800 parts of ice-water, then 15 parts of sodium hydrogen sulfite and 30 parts of nickel sulfate heptahydrate are added and the whole heated for 1 hour at 85°. After cooling the 35° the nickel-containing green amino dye, which is completely precipitated, is filtered off and washed with a little cold water. The dye is stirred into 120 parts of a 40% aqueous solution of sodium chloroacetate, the pH value of the suspension brought to 2.5 with chloroacetic acid, and in the course of several hours 30% chlorobenzolic chloroacetyl chloride solution is dropped in at an even rate at +4° until no more amino dye is indicated. After diluting with cold water, the chloroacetylated dye is filtered off, washed with ice-water and carefully dried. When wool fabric is dyed with the dye of this example by the method described in Example 5, a green dyeing of very good wet and light fastness is obtained. When the 30 parts of nickel sulfate heptahydrate in this example are replaced by 27 parts of copper sulfate pentahydrate and the process carried out as described above, a red dyestuff having equally very good fastness to light and wet treatments is obtained.

The following table contains further metal complex compounds of dyes of the formula

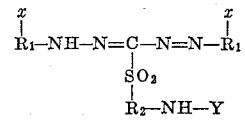

which are obtainable according to the particulars of Examples 1 to 6 and are characterized by the amine from which

is derived, by the amino radical from which $R_2$—NH— is derived, by the reactive component from which Y is derived, by the metal employed for the metal complex formation and by the shade of the dyeing on cotton or wool in the columns (I) to (V) respectively.

Table

| | (I) R₁—NH₂ with X | (II) R₂—NH₂ | (III) Y=derived from | (IV) Metal | (V) Shade of the dyeing on cotton or wool |
|---|---|---|---|---|---|
| 7 | 1-amino-2-carboxybenzene-4-sulfonic acid | 4-aminophenyl | Cyanuric bromide | Cu | Bluish red. |
| 8 | ....do.... | ....do.... | 2,4,6-trichloropyrimidine | Cu | Do. |
| 9 | ....do.... | ....do.... | 2,4,5,6-tetrachloropyrimidine | Cu | Do. |
| 10 | ....do.... | ....do.... | ....do.... | Ni | Olive. |
| 11 | 1-amino-2-hydroxybenzene-5-sulfonic acid amide | 4-aminonaphthyl-1- | 2-phenylamino-4,6-dichloro-1,3,5-triazine-3'-sulfonic acid | Ni | Reddish gray. |
| 12 | ....do.... | 5-aminonaphthyl-1- | ....do.... | Cu | Gray. |
| 13 | ....do.... | 5-aminonaphthyl-2- | 2-ethylamino-4,6-dichloro-1,3,5-triazine-2'-sulfonic acid | Cu | Do. |
| 14 | ....do.... | ....do.... | 2-(2'-carboxyphenylamino)-4,6-di-chloro-1,3,5-triazine | Cu | Do. |
| 15 | ....do.... | 4-aminophenyl | β-Bromopropionyl chloride | Cu | Do. |
| 16 | ....do.... | ....do.... | 5-carboxy-2,4,6-trichloropyrimidine | Cu | Do. |
| 17 | ....do.... | ....do.... | 2-(3'-methoxybutylamino)-4,6-dichloro-1,3,5-triazine | Cu | Do. |
| 18 | ....do.... | 4-aminonaphthyl-1- | 2-(2'-hydroxyethylamino)-4,6-dichloro-1,3,5-triazine | Cu | Do. |
| 19 | ....do.... | ....do.... | 2-(N-methyl-N-ethylamino)-4,6-dichloro-1,3,5-triazine-2'-sulfonic acid | Cu | Do. |
| 20 | 1-amino-2-hydroxybenzene-5-sulfonic acid-(2',5-dicarboxy)-phenylamide | 4-amino-3-methoxy phenyl | 2,4,5,6-tetrabromopyrimidine | Cu | Blue-gray. |
| 21 | ....do.... | ....do.... | 2,4-dichloro-5-chloromethyl-6-methylpyrimidine | Cu | Do. |
| 22 | ....do.... | ....do.... | 2,4,5-trichloropyrimidine | Cu | Do. |
| 23 | ....do.... | ....do.... | γ-Chlorocrotonyl chloride | Cu | Do. |
| 24 | ....do.... | ....do.... | 2-ethylamino-4,6-dichloro-1,3,5-triazine | Cu | Do. |
| 25 | ....do.... | 4-amino-2,5-dimethoxyphenyl | α,β-Dichloroacrylyl chloride | Co | Gray. |
| 26 | 1-amino-2-hydroxybenzene-5-sulfonic acid-(2',5-dicarboxy)-phenylamide | ....do.... | 2,4,6-tribromo-5-bromovinylpyrimidine | Cu | Do. |
| 27 | ....do.... | 4-aminophenyl | 2-(N-methyl-N-phenylamino)-4,6-dichloro-1,3,5-triazine | Cu | Do. |
| 28 | ....do.... | ....do.... | Acrylyl chloride | Cu | Do. |
| 29 | 1-amino-2-hydroxybenzene-4-sulfonic acid-(2'-carbosy)-phenylamide | ....do.... | α,β-Dichloropropionylchloride | Co | Do. |
| 30 | ....do.... | ....do.... | 2,4,6-trichloro-5-methylpyrimidine | Co | Do. |
| 31 | ....do.... | 4-amino-2-methylphenyl | 2-di-(2'-hydroxypropyl)-amino-4,6-dichloro-1,3,5-triazine | Cu | Do. |
| 32 | 1-amino-2-hydroxybenzene-5-sulfonic acid-(2'-carboxy)-phenylamide | ....do.... | 2,4-dichloro-6-carbomethoxypyrimidine | Cu | Do. |
| 33 | ....do.... | ....do.... | 2,4-dichloro-5-chloromethylpyrimidine | Cu | Do. |
| 34 | 1-amino-2-hydroxybenzene-4-sulfonic acid-(2',3'-dicarboxy)-phenylamide | 4-amino-2,5-dimethylphenyl | 2,4,5,6-tetrachloropyrimidine | Cu | Do. |
| 35 | ....do.... | ....do.... | α,β-Dibromopropionyl chloride | Cu | Do. |
| 36 | 1-amino-2-hydroxybenzene-5-sulfonic acid-(2',4'-di-carboxy)-phenylamide | ....do.... | 2,4,6-tribromo-5-bromomethylpyrimidine | Cu | Blue-gray. |
| 37 | ....do.... | 4-aminophenyl | 2,4-dichloro-6-trichloromethylpyrimidine | Cu | Gray. |
| 38 | 1-amino-2-hydroxybenzene-5-sulfonic acid-(2',3'-dicarboxy)-phenylamide | ....do.... | 2,4,6-trichloro-5-allylpyrimidine | Ni | Reddish gray. |
| 39 | 1-amino-2-hydroxybenzene-4-sulfonic acid-(2',4'-dicarboxy)-phenylamide | ....do.... | 2,4,6-tribromopyrimidine | Ni | Do. |
| 40 | ....do.... | 4-amino-2,5-dimethoxyphenyl | β-Chloropropionyl chloride | Cu | Blue-gray. |
| 41 | ....do.... | ....do.... | 2-(N-ethyl-N-phenylamino)-4,6-dichloro-1,3,5-triazine | Cu | Do. |
| 42 | 1-amino-2-hydroxybenzene-4-sulfonic acid-phenylamide-3'-sulfonic acid | 4-aminophenyl | 2,4,6-trichloro-5-carbomethoxypyrimidine | Cu | Do. |
| 43 | ....do.... | ....do.... | 2-phenylamino-4,6-dichloro-1,3,5-triazine | Cu | Do. |
| 44 | 1-amino-2-hydroxybenzene-5-sulfonic acid phenylamide-4'-sulfonic acid | ....do.... | 2,4,6-trichloro-5-chloromethylpyrimidine | Cu | Do. |
| 45 | ....do.... | 3-amino-4-methoxyphenyl | 2-diethylamino-4,6-dichloro-1,3,5-triazine | Cu | Blue. |
| 46 | 1-amino-2-hydroxybenzene-4-sulfonic acid-(2'-methyl)-phenylamide-5'-sulfonic acid | ....do.... | 2,4,6-tribromo-5-carbethoxy-pyrimidine | Cu | Do. |
| 47 | ....do.... | 4-amino-2-methylphenyl | α,β-Dibromoacrylyl chloride | Cu | Do. |
| 48 | ....do.... | ....do.... | 2-(4'-methoxybutylamino)-4,6-dichloro-1,3,5-triazine | Cu | Do. |
| 49 | 1-amino-2-hydroxybenzene-4-sulfonic acid-(3'-aminosulfonyl)-phenylamide | 4-amino-3-carboxyphenyl | 2,4,6-tribromo-5-carboxy-pyrimidine | Cu | Reddish blue. |
| 50 | ....do.... | ....do.... | 2-amino-4,6-dibromo-1,3,5-triazine | Cu | Do. |
| 51 | 1-amino-2-hydroxybenzene-5-sulfonic acid-(3'-aminosulfonyl)-phenylamide | 4-aminophenyl | 2,4,6-trichloro-5-carboxy-methylpyrimidine | Cu | Gray. |
| 52 | ....do.... | ....do.... | Bromoacetyl chloride | Cu | Do. |
| 53 | 1-amino-2-hydroxybenzene-5-sulfonic acid amide | 3-amino-4-methoxyphenyl | 2,4,5,6-tetrachloropyrimidine | Cu | Blue-gray. |
| 54 | ....do.... | 4-aminophenyl | α-Chloroacrylyl chloride | Cu | Do. |
| 55 | ....do.... | ....do.... | 2-carboxymethylamino-4,6,dichloro-1,3,5-triazine | Cu | Do. |
| 56 | 1-amino-2-hydroxybenzene-5-sulfonic acid methylamide | ....do.... | 2,4-dibromo-5-bromomethyl-6-methylpyrimidine | Cu | Do. |
| 57 | ....do.... | ....do.... | 2-naphthyl-2'-amino-4,6-dichloro-1,3,5-triazine-6'-sulfonic acid | Cu | Do. |
| 58 | 1-amino-2-hydroxy-benzene-4-sulfonic acid ethylamide | ....do.... | 2,4,6-trichloro-5-ethylpyrimidine | Cu | Gray. |
| 59 | 1-amino-2-hydroxybenzene-5-sulfonic acid n-butylamide | ....do.... | 2,4,6-trichloro-5-carboxymethylpyrimidine | Cu | Do. |
| 60 | ....do.... | ....do.... | 2-(2'-hydroxypropylamino)-4,6-dichloro-1,3,5-triazine | Cu | Do. |
| 61 | 1-amino-2-hydroxybenzene-5-sulfonic acid isopropylamide | ....do.... | 2,4,5-tribromopyrimidine | Cu | Do. |
| 62 | 1-amino-2-hydroxybenzene-4-sulfonic acid methylamide | ....do.... | 2,4,6-trichloro-5-carbethoxy-pyrimidine | Cu | Do. |
| 63 | ....do.... | ....do.... | β-Chloropropionyl chloride | Cu | Do. |
| 64 | ....do.... | ....do.... | 2-phenylamino-4,6-dichloro-1,3,5-triazine-2'-sulfonic acid | Cu | Do. |
| 65 | 1-amino-2-hydroxybenzene-5-sulfonic acid ethylamide | ....do.... | 2,4-dibromo-5-bromomethylpyrimidine | Cu | Do. |
| 66 | ....do.... | ....do.... | 2-amino-4,6-dichloro-1,3,5-triazine | Cu | Do. |
| 67 | 1-amino-2-hydroxybenzene-5-sulfonic acid-(3'-methoxy)-propylamide | 3-aminophenyl | 2,4,6-tribromo-5-carboxymethylpyrimidine | Cu | Do. |
| 68 | 1-amino-2-hydroxybenzene-4-sulfonic acid-(3'-methoxy)-propylamide | ....do.... | 2,4,6-trichloro-5-chlorovinylpyrimidine | Cu | Blue-gray. |

3,202,649

*Table* Continued

| | (I) $R_1-NH_2$ with X | (II) $R_2-NH_2$ | (III) Y=derived from | (IV) Metal | (V) Shade of the dyeing on cotton or wool |
|---|---|---|---|---|---|
| 69 | 1-amino-2-hydroxybenzene-5-sulfonic acid-(2'-ethoxy)-ethylamide. | 4-amino-3-carboxyphenyl | 2,4,5,6-tetrachloropyrimidine | Cu | Gray. |
| 70 | ___do___ | ___do___ | α-Bromoacrylyl chloride | Cu | Do. |
| 71 | ___do___ | ___do___ | 2-(3-carboxyphenylamino)-4,6-dichloro-1,3,5-triazine. | Cu | Do. |
| 72 | 1-amino-2-hydroxybenzene-4-sulfonic acid-(3'-methoxy)-butylamide. | ___do___ | 2,4,6-trichloro-5-carboxypyrimidine | Cu | Blue-gray. |
| 73 | 1-amino-2-hydroxybenzene-5-sulfonic acid-di-(2'-hydroxyethyl)-amide. | ___do___ | 2,4,6-tribromo-5-carbomethoxypyrimidine. | Cu | Gray. |
| 74 | ___do___ | 4-aminophenyl | 2-(N-methyl-N-carboxymethylamino)-4,6-dichloro-1,3,5-triazine. | Cu | Do. |
| 75 | 1-amino-2-hydroxybenzene-5-sulfonic acid-di-(2'-hydroxypropyl)-amide. | ___do___ | 2-(3'-methoxypropylamino)-4,6-dichloro-1,3,5-triazine. | Cu | Do. |
| 76 | ___do___ | ___do___ | 2,4,6-tribromo-5-methylpyrimidine | Cu | Do. |
| 77 | ___do___ | ___do___ | Methacrylyl chloride | Cu | Do. |
| 78 | 1-amino-2-hydroxybenzene-4-sulfonic acid-di-(2'-hydroxyethyl)-amide. | ___do___ | 2,4,6-trichloropyrimidine | Cu | Blue-gray. |
| 79 | 1-amino-2-hydroxybenzene-5-sulfonic acid-(2'-hydroxy)-ethylamide. | ___do___ | ___do___ | Cu | Gray. |
| 80 | 1-amino-2-hydroxybenzene-5-sulfonic acid-(2'-hydroxy)-propylamide. | 4-amino-3-carboxyphenyl | 2,4,5,6-tetrachloropyrimidine | Cu | Do. |
| 81 | 1-amino-2-hydroxybenzene-5-sulfonic acid-(2'-hydroxy)-butylamide. | ___do___ | ___do___ | Cu | Do. |
| 82 | 1-amino-2-hydroxybenzene-4-sulfonic acid-(2'-hydroxy)-ethylamide. | ___do___ | ___do___ | Cu | Blue-Gray. |
| 83 | 1-amino-2-hydroxybenzene-5-sulfonic acid cyclohexylamide. | 4-aminophenyl | 2-phenylamino-4,6-dichloro-1,3,5-triazine-2',5'-disulfonic acid. | Cu | Gray. |
| 84 | 1-amino-2-hydroxybenzene-5-sulfonic acid-diethylamide. | ___do___ | ___do___ | Cu | Do. |
| 85 | 1-amino-2-hydroxybenzene-4-sulfonic acid-dimethylamide. | ___do___ | ___do___ | Cu | Do. |
| 86 | 1-amino-2-hydroxybenzene-5-sulfonic acid-dimethylamide. | 3-amino-6-methylphenyl | 2-phenylamino-4,6-dichloro-1,3,5-triazine-2',4'-disulfonic acid. | Cu | Do. |
| 87 | 1-amino-2-hydroxybenzene-5-sulfonic acid-(4'-methyl)-cyclohexylamide. | ___do___ | ___do___ | Cu | Do. |
| 88 | 1-amino-2-hydroxybenzene-5-sulfonic acid | 4-amino-2,5-dimethoxyphenyl. | 2,4,6-trichloropyrimidine | Cu | Do. |
| 89 | ___do___ | ___do___ | 2,4-dichloropyrimidine | Ni | Reddish gray. |
| 90 | ___do___ | 4-aminophenyl | 2,4-dibromo-6-carbethoxypyrimidine | Ni | Do. |
| 91 | 1-amino-2-hydroxybenzene-4-sulfonic acid | ___do___ | 2,6-dichloro-4-methylpyrimidine | Cu | Blue-gray. |
| 92 | ___do___ | ___do___ | 2,4-dibromo-5-carbomethoxypyrimidine | Cu | Do. |
| 93 | ___do___ | ___do___ | 2,4,5,6-tetrachloropyrimidine | Cu | Do. |
| 94 | 1-amino-2-hydroxybenzene-5-sulfonic acid-carboxymethylamide. | ___do___ | 2,4-dichloro-5-carboxypyrimidine | Cu | Gray. |
| 95 | ___do___ | ___do___ | 2-phenylamino-4,6-dichloro-1,3,5-triazine-4'-sulfonic acid. | Ni | Reddish |
| 96 | 1-amino-2-hydroxybenzene-5-sulfonic acid-(2'-carboxy)-ethylamide. | ___do___ | 2,4,5,6-tetrachloropyrimidine | Cu | Gray. |
| 97 | ___do___ | ___do___ | γ-Bromocrotonyl chloride | Cu | Do. |
| 98 | ___do___ | ___do___ | 2-(4'-carboxyphenylamino)-4,6-dichloro-1,3,5-triazine. | Cu | Do. |
| 99 | 1-amino-2-hydroxybenzene-4-sulfonic acid-carboxymethylamide. | ___do___ | 2,4,6-trichloropyrimidine | Cu | Blue-gray. |
| 100 | 1-amino-2-hydroxybenzene-5-sulfonic acid-(2'-sulfo)-ethylamide. | ___do___ | 2,4,6-tribromo-5-ethylpyrimidine | Cu | Gray. |
| 101 | ___do___ | ___do___ | 2,4,5,6-tetrabromopyrimidine | Cu | Do. |
| 102 | ___do___ | ___do___ | α,β-dichloro-propionyl chloride | Cu | Do. |
| 103 | ___do___ | ___do___ | 2-N-(2'-hydroxyethyl-N-phenylamino)-4,6-dichloro-1,3,5-triazine. | Cu | Do. |
| 104 | 1-amino-2-hydroxybenzene-4-sulfonic acid-(2'-sulfo)-ethylamide. | 3-amino-4-methoxyphenyl | 2,4,6-trichloropyrimidine | Cu | Blue-gray. |
| 105 | 1-amino-2-hydroxybenzene-5-sulfonic acid-(3'-sulfo)-phenylamide. | ___do___ | 2-(2'-methoxyethylamino)-4,6-dichloro-1,3,5-triazine. | Cu | Gray. |
| 106 | ___do___ | ___do___ | 2,4-dichloro-5-chloromethyl-6-methylpyrimidine. | Cu | Do. |
| 107 | 1-amino-2-hydroxybenzene-5-sulfonic acid-(4'-sulfo)-phenylamide. | ___do___ | 2-dimethylamino-4,6-dichloro-1,3,5-triazine. | Cu | Do. |
| 108 | ___do___ | 3-aminophenyl | 2,4,6-trichloropyrimidyl-5-acetyl chloride | Cu | Do. |
| 109 | ___do___ | ___do___ | 2,4-dibromopyrimidine | Cu | Do. |
| 110 | ___do___ | ___do___ | Chloracetyl chloride | Cu | Do. |
| 111 | 1-amino-2-hydroxybenzene-5-sulfonic acid-(2'-methyl-5'-sulfo)-phenylamide. | ___do___ | 2-(2'-methoxy)-propylamino-4,6-dichloro-1,3,5-triazine. | Cu | Do. |
| 112 | ___do___ | ___do___ | 2,4,6-trichloropyrimidine | Cu | Do. |
| 113 | 1-amino-2-hydroxybenzene-5-sulfonic acid-(3'-methylsulfonylamino)-phenylamide. | 4-amino-3-carboxyphenyl | ___do___ | Cu | Do. |
| 114 | 1-amino-2-hydroxy-5-methylsulfonylbenzene. | ___do___ | 2-(2'-carboxy)-ethylamino-4,6-dichloro-1,3,5-triazine. | Cu | Do. |
| 115 | 1-amino-2-hydroxy-5-methylbenzene | ___do___ | 2-naphthyl-(2')-amino-4,6-dichloro-1,3,5-triazine-3',6'-disulfonic acid. | Cu | Do. |
| 116 | 1-amino-2-hydroxy-5-chlorobenzene | 4-aminophenyl | 2-naphthyl-(1')-amino-4,6-dichloro-1,3,5-triazine-4',8'-disulfonic acid. | Cu | Blue. |
| 117 | 1-amino-2-hydroxy-5-tert. butylbenzene | ___do___ | 2-phenylamino-4,6-dichloro-1,3,5-triazine-2',5'-disulfonic acid. | Cu | Reddish blue. |
| 118 | 1-amino-2-hydroxy-3-nitro-5-methylbenzene. | ___do___ | ___do___ | Cu | Do. |
| 119 | 1-amino-2-hydroxy-3,5-dinitrobenzene | ___do___ | ___do___ | Cu | Gray. |
| 120 | 1-amino-2-hydroxy-5-ethylbenzene | ___do___ | ___do___ | Cu | Reddish gray. |
| 121 | 1-amino-2-hydroxy-5-nitrobenzene | ___do___ | ___do___ | Cu | Blue. |
| 122 | 1-amino-2-hydroxy-3-nitro-5-chlorobenzene | 4-amino-3-carboxyphenyl | ___do___ | Ni | Reddish blue. |
| 123 | 1-amino-2-hydroxy-3-chloro-5-nitrobenzene | ___do___ | 2-naphthyl-(2')-amino-4,6-dichloro-1,3,5-triazine-4',8'-disulfonic acid. | Ni | Do. |
| 124 | 1-amino-2-hydroxy-3-methyl-5-nitrobenzene | ___do___ | 2-naphthyl-(2')-amino-4,6-dichloro-1,3,5-triazine-5',7'-disulfonic acid. | Cu | Do. |
| 125 | 1-amino-2-hydroxy-3,5-dichlorobenzene | ___do___ | 2-naphthyl-(2')-amino-4,6-dichloro-1,3,5-triazine-6',8'-disulfonic acid. | Cu | Do. |
| 126 | 1-amino-2-hydroxy-3,5,6-trichlorobenzene | ___do___ | 2-naphthyl-(2')-amino-4,6-dichloro-1,3,5-triazine-4',6',8'-trisulfonic acid. | Cu | Do. |
| 127 | 1-amino-2-hydroxy-4,5-dimethylbenzene | ___do___ | ___do___ | Cu | Do. |

Table Continued

| | (I) $R_1{-}NH_2$ with x | (II) $R_2{-}NH_2$ | (III) Y=derived from | (IV) Metal | (V) Shade of the dyeing on cotton or wool |
|---|---|---|---|---|---|
| 128 | 1-amino-2-hydroxy-4-nitro-5-chlorobenzene | 4-aminophenyl | 2-naphthyl-(1')-amino-4,6-dichloro-1,3,5-triazine-3',6',8'-trisulfonic acid. | Cu | Bluish red. |
| 129 | 1-amino-2-hydroxy-4-nitro-5-methylsulfonylbenzene. | do | 2-naphthyl-(2')-amino-4,6-dichloro-1,3,5-triazine-3',6',8'-trisulfonic acid. | Cu | Do. |
| 130 | 1-amino-2-hydroxybenzene-5-sulfonic acid dimethylamide. | do | 2-naphthyl-(1')-amino-4,6-dichloro-1,3,5-triazine-3',8'-disulfonic acid. | Cu | Gray. |
| 131 | 1-amino-2-hydroxybenzene-5-sulfonic acid | do | 2-naphthyl-(2')-amino-4,6-dichloro-1,3,5-triazine-5'-sulfonic acid. | Cu | Do. |
| 132 | do | do | 2-phenylamino-4,6-dibromo-1,3,5-triazine-3'-sulfonic acid. | Cu | Do. |
| 133 | do | do | 2-(2'-ethoxy)-ethylamino-4,6-dichloro-1,3,5-triazine. | Cu | Do. |
| 134 | 1-amino-2-carboxybenzene-4-sulfonic acid | do | 2-methylamino-4,6-dichloro-1,3,5-triazine | Cu | Red. |
| 135 | do | do | β-chloropropionyl chloride | Cu | Do. |
| 136 | do | do | 2,4,5,6-tetrachloropyrimidine | Cu | Do. |
| 137 | 1-amino-2-carboxybenzene-4-sulfonic acid amide. | do | do | Cu | Do. |
| 138 | do | do | 2-naphthyl-(1')-amino-4,6-dichloro-1,3,5-triazine-3',6'-disulfonic acid. | Cu | Do. |
| 139 | do | do | α-Chloracrylyl chloride | Cu | Do. |
| 140 | 1-amino-2-carboxybenzene-4-sulfonic acid methylamide. | do | 2,4,6-trichloropyrimidine | Cu | Do. |
| 141 | do | do | 2-naphthyl-(1')-amino-4,6-dichloro-1,3,5-triazine-5'-sulfonic acid. | Cu | Do. |
| 142 | 1-amino-2-carboxybenzene-4-sulfonic acid-(3'-methoxy)-propylamide. | 4-amino-3-carboxyphenyl | 2-naphthyl-(2')-amino-4,6-dichloro-1,3,5-triazine-6'-sulfonic acid. | Cu | Do. |
| 143 | 1-amino-2-carboxybenzene-4-sulfonic acid-(2'-hydroxy)-ethylamide. | do | 2-naphthyl-(1')-amino-4,6-dichloro-1,3,5-triazine-4'-sulfonic acid. | Cu | Do. |
| 144 | do | do | 2,4,6-trichloropyrimidine | Cu | Do. |
| 145 | 1-amino-2-carboxybenzene-4-sulfonic acid-(2'-carboxy)-phenylamide. | do | 2,4,6-tribromopyrimidyl-5-acetyl chloride. | Cu | Do. |
| 146 | do | do | β-Chloropropionyl chloride | Cu | Red. |
| 147 | do | 3-aminophenyl | 2-di-(2'-hydroxethyl)-amino-4,6-dichloro-1,3,5-triazine. | Cu | Do. |
| 148 | 1-amino-2-carboxybenzene-4-sulfonic acid-ethylamide. | 4-aminophenyl | do | Cu | Do. |
| 149 | do | do | 2,4,6-trichloro-5-carboxymethylpyrimidine. | Cu | Do. |
| 150 | 1-amino-2-carboxybenzene-4-sulfonic acid-carboxymethylamide. | do | 2,4,5,6-tetrachloropyrimidine | Cu | Do. |
| 151 | do | do | Bromoacetyl chloride | Cu | Do. |
| 152 | 1-amino-2-carboxybenzene-4-sulfonic acid-(2'-ethoxy)-ethylamide. | 4-amino-3-carboxyphenyl | 2,4,6-trichloro-5-carboxypyrimidine | Cu | Do. |
| 153 | do | do | α,β-Dibromopropionyl chloride | Cu | Do. |
| 154 | do | do | 2-phenylamino-4,6-dichloro-1,3,5-triazine-2',5'-disulfonic acid. | Cu | Do. |
| 155 | 1-amino-2-carboxybenzene-4-sulfonic acid-(4'-sulfo)-phenylamide. | 4-amino-2-methylphenyl | 2,4,5,6-tetrachloropyrimidine | Cu | Do. |
| 156 | do | 4-aminophenyl | 2-(2'-hydroxyethylamino)-4,6-dibromo-1,3,5-triazine. | Cu | Do. |
| 157 | do | do | β-Chloropropionyl chloride | Cu | Do. |
| 158 | 1-amino-2-carboxybenzene-4-sulfonic acid-(1'-carboxy)-ethylamide. | do | 2-naphthyl-(1')-amino-4,6-dichloro-1,3,5-triazine-8'-sulfonic acid. | Cu | Do. |
| 159 | do | 4-amino-3-carboxyphenyl | 2,4,6-trichloropyrimidine | Cu | Do. |
| 160 | 1-amino-2-carboxybenzene-4-sulfonic acid-(2'-sulfo)-ethylamide. | do | 2-naphthyl-(1')-amino-4,6-dichloro-1,3,5-triazine-6'-sulfonic acid. | Cu | Do. |
| 161 | do | do | α,β-Dichloro-acrylyl chloride | Cu | Do. |
| 162 | do | do | 2,4,5,6-tetrabromopyrimidine | Cu | Do. |
| 163 | do | do | Cyanuric bromide | Cu | Do. |
| 164 | 1-amino-2-carboxybenzene-4-sulfonic acid-(2'-hydroxy)-propylamide. | do | 2-(4'-carboxyphenylamino)-4,6-dichloro-1,3,5-triazine. | Cu | Do. |
| 165 | 1-amino-2-carboxybenzene-4-sulfonic acid | 4-aminophenyl | Cyanuric chloride | Ni | Green. |
| 166 | do | do | 2-naphthyl-(1')-amino-4,6-dichloro-1,3,5-triazine-7'-sulfonic acid. | Ni | Do. |

Formulae of representative dyes of the foregoing examples are as follows:

*Example 1.*—The copper complex compound of

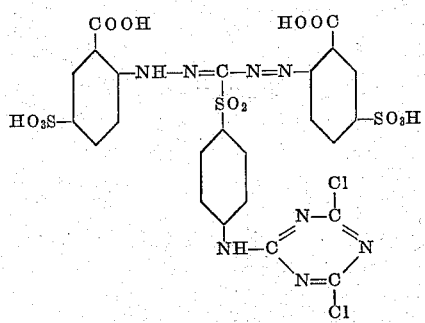

*Example 2.*—The copper complex compound of

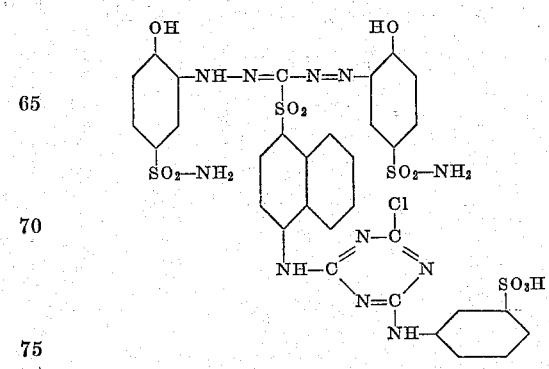

*Example 3.*—The copper complex compound of

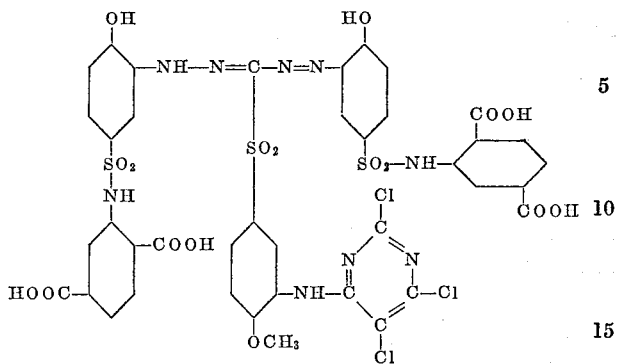

*Example 4.*—The copper complex compound of

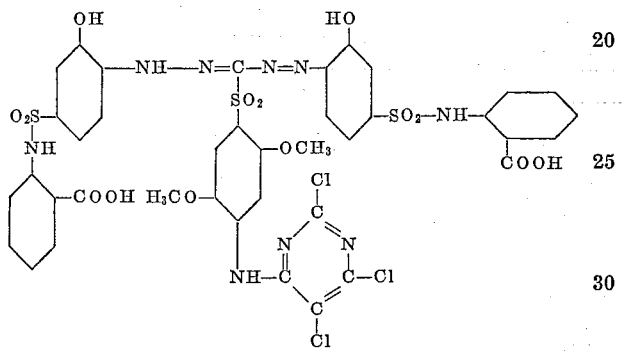

*Example 5.*—The cobalt complex compound of

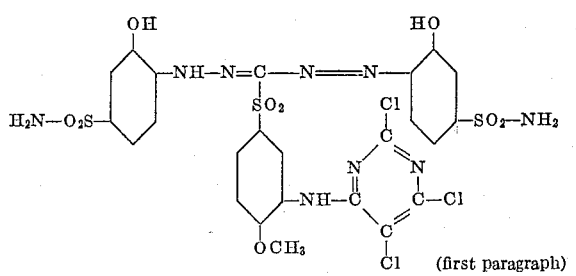

(first paragraph)

*Example 6.*—The nickel complex compound of

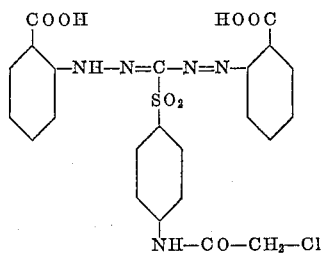

*Example 8.*—The copper complex compound of

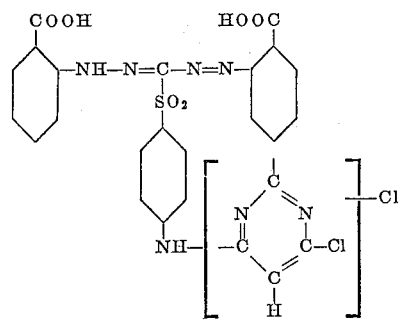

*Example 21.*—The copper complex compound of

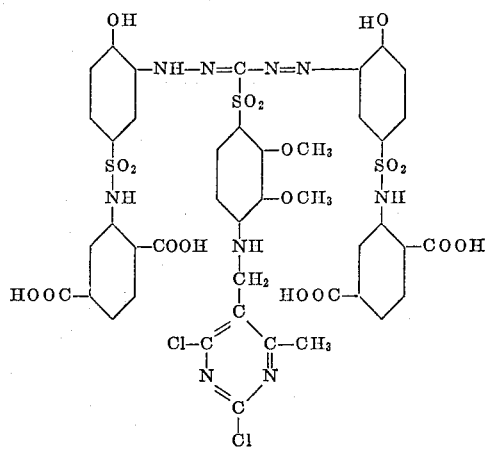

*Example 53.*—The copper complex compound of

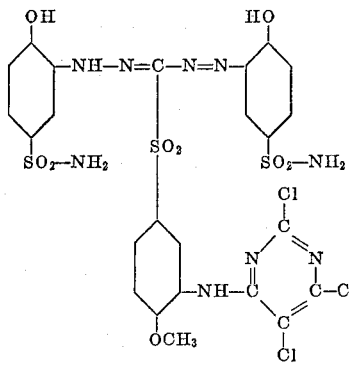

On condensing 2,4,5-trichloro- or 2,4,5-tribromopyrimidine with an amino dye, a mixture of the 2,5-dichloro- or 2,5-dibromo-pyrimidyl - 4 - amino dye and of the 4,5-dichloro- or 4,5-dibromopyrimidyl-2-amino dye is very probably obtained.

Similarly on condensing 2,6-dichloro- or 2,6-dibromo-pyrimidine or their derivatives with an amino dye, a mixture of the 2-chloro- or 2-bromopyrimidyl-6-amino dye and of the 6-chloro- or 6-bromopyrimidyl-2-amino dye is very probably obtained.

The derivatives of 2,4,6-trichloro- or 2,4,6-tribromopyrimidine bearing in the 5-position a substituent other than halogen give mixtures similar to those produced with 2,4,6-trichloro- or 2,4,6-tribromopyrimidine (cf. formula of Example 8), whereas 2,4,6-trichloro-5-chloromethylpyrimidine and 2,4,6-tribromo - 5 - bromomethyl-pyrimidine react in the same manner as 2,4-dichloro-5-chloromethyl-pyrimidine and 2,4-dichloro - 5 - chloromethyl-6-methylpyrimidine (cf. formula of Example 21).

The formula of Example 8 indicates that there is a mixture of the 2,6-dichloro-pyrimidyl-4- dye and of the 4,6-dichloropyrimidyl-2- dye.

Having thus disclosed the invention, what I claim is:
1. A member selected from the group consisting of the copper, nickel and cobalt complex compounds of a dye of the formula

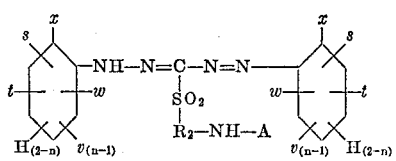

wherein
$R_2$ represents a member selected from the group consisting of phenylene, methylphenylene, dimethylphenylene, methoxyphenylene, dimethoxyphenylene, carboxyphenylene and naphthylene,

17

*x* represents a member selected from the group consisting of hydroxy and carboxy,

*s* represents a member selected from the group consisting of hydrogen, methyl, chlorine, nitro and lower alkanoylamino,

*t* represents a member selected from the group consisting of hydrogen, chlorine, methyl and nitro,

*v* represents a member selected from the group consisting of methylsulfonyl, sulfonic acid, sulfonic acid amide, sulfonic acid lower alkylamide, sulfonic acid di-(lower alkyl) amide, sulfonic acid lower hydroxyalkylamide, sulfonic acid di-(lower hydroxyalkyl)-amide, sulfonic acid lower alkoxyalkylamide, sulfonic acid cycloalkylamide, sulfonic acid carboxy-lower alkylamide, sulfonic acid lower alkylamide-sulfonic acid and sulfonic acid mononuclear arylamide substituted by one to two water-solubilizing groups,

*w* represents a member selected from the group consisting of hydrogen and chlorine, A represents a member selected from the group consisting of unsubstituted monohalogenopyrimidyl, monohalogeno-6-methylpyrimidyl, monohalogeno-6-lower carbalkoxypyrimidyl, monohalogeno-6-trichloromethyl - pyrimidyl, monohalogeno - 5 - halogenopyrimidyl, unsubstituted dihalogenopyrimidyl, dihalogeno-5-lower alkylpyrimidyl, dihalogeno-5-lower carbalkoxypyrimidyl, dihalogeno - 5 - carboxypyrimidyl, dihalogeno-5-carboxymethylpyrimidyl, dihalogeno - 5 - halogenovinylpyrimidyl, dihalogeno-5-allylpyrimidyl, trihalogenopyrimidyl, 2,4-dihalogenopyrimidyl - 5 - methylene, 2,4 - dihalogeno-6-methylpyrimidyl - 5 - methylene, 2,4,6-trihalogeno-pyrimidyl-5-methylene, 2,4,6-trihalogeno-pyrimidyl-5-acetyl, 4,6-dihalogeno-1,3,5-triazinyl-2, 4 - halogeno - 6 - amino-1,3,5 - triazinyl-2, 4 - halogeno - 6-lower alkylamino-1,3,5 - triazinyl - 2, 4 - halogeno-6-di-(lower alkyl)-amino-1,3,5-triazinyl-2, 4-halogeno-6-lower hydroxyalkylamino - 1,3,5-triazinyl-2, 4-halogeno-6-di-(lower hydroxyalkyl) - amino - 1,3,5-triazinyl-2,4-halogeno-6-lower alkoxyalkylamino-1,3,5-triazinyl-2,4-halogeno-6-lower carboxyalkylamino - 1,3,5-triazinyl - 2,4-halogeno-6-N-lower alkyl-N-lower carboxyalkylamino-1,3,5-triazinyl-2, 4-halogeno-6-lower sulofalkylamino-1,3,5-triazinyl-2, 4-halogeno-6-N-lower alkyl-N-lower sulfoalkylamino-1,3,5-triazinyl-2, 4-halogeno - 6-phenylamino-1,3,5-triazinyl1-2, 4-halogeno-6-N - lower alkyl - N-phenylamino-1,3,5-triazinyl-2, 4-halogeno - 6 - N-lower hydroxyalkyl-N-phenylamino-1,3,5-triazinyl-2, 4-halogeno-6-carboxyphenylamino-1,3,5-triazinyl-2, 4-halogeno-6-sulfophenylamino-1,3,5-triazinyl-2, 4-halogeno-6-disulfophenylamino-1,3,5-triazinyl-2, 4 - halogeno-6-sulfonaphthylamino-1,3,5,-triazinyl-2, 4-halogeno-6-disulfonaphthylamino-1,3,5-triazinyl - 2, 4 - halogeno-6-trisulfonaphthylamino-1,3,5-triazinyl-2, halogeno-lower alkanoyl, dihalogeno-lower alkanoyl, lower alkenoyl, halogeno-lower alkenoyl and dihalogeno-lower alkenoyl, halogen having an atomic weight between 35 and 81, and

*n* is one of the integers 1 and 2.

2. The copper complex compound of

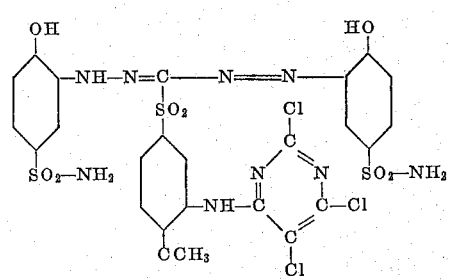

18

3. The copper complex compound of

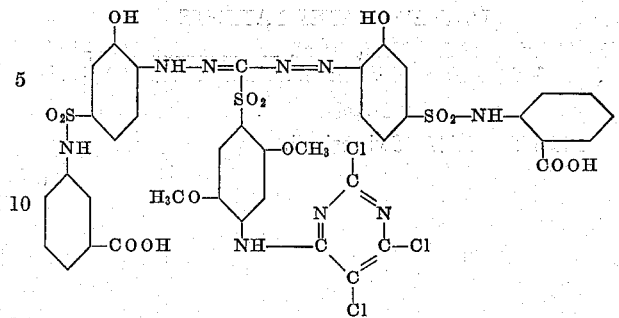

4. The copper complex compound of

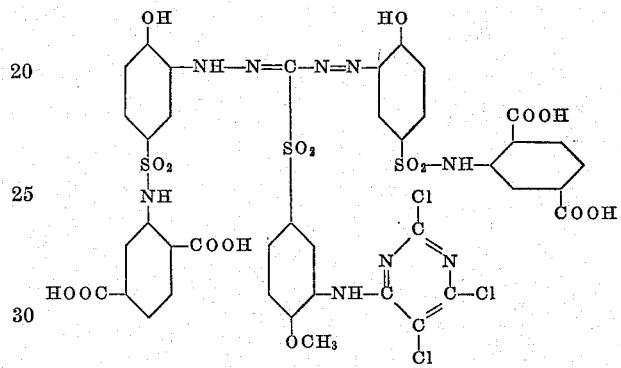

5. The copper complex compound of

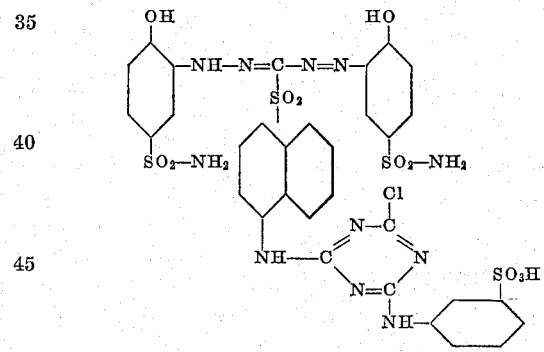

6. The cobalt complex compound of

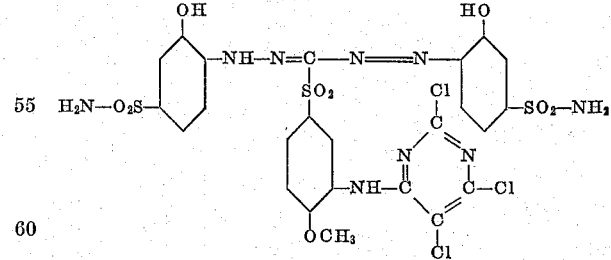

7. The nickel complex compound of

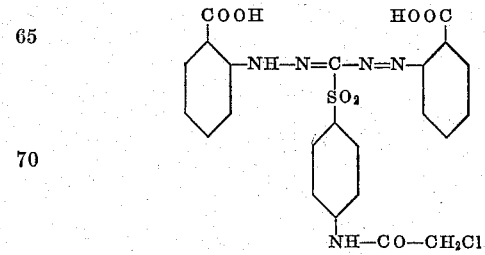

(References on following page)

References Cited by the Examiner

UNITED STATES PATENTS 3,041,328  6/62  Kraus et al. _____ 260—146
3,068,219  12/62  Beffa et al. _____ 260—146

FOREIGN PATENTS 246,475  9/47  Switzerland.

OTHER REFERENCES

Nineham: "Chem. Review," vol. 55, No. 2, April 1955, pp. 355–483.

Wegmann: "Textile Praxis," October 1958, pp. 1056–1058.

CHARLES B. PARKER, *Primary Examiner.*